US008831650B2

(12) United States Patent
Stojanovski et al.

(10) Patent No.: US 8,831,650 B2
(45) Date of Patent: Sep. 9, 2014

(54) METHOD OF EXCHANGING SMS DATA IN A WIRELESS COMMUNICATIONS SYSTEM

(75) Inventors: Saso Stojanovski, Paris (FR); Arnaud Vedrine, Paris (FR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 13/512,072

(22) PCT Filed: Feb. 9, 2011

(86) PCT No.: PCT/KR2011/000874
§ 371 (c)(1),
(2), (4) Date: May 25, 2012

(87) PCT Pub. No.: WO2011/099774
PCT Pub. Date: Aug. 18, 2011

(65) Prior Publication Data
US 2013/0115982 A1    May 9, 2013

Related U.S. Application Data

(60) Provisional application No. 61/303,262, filed on Feb. 10, 2010, provisional application No. 61/303,614, filed on Feb. 11, 2010.

(51) Int. Cl.
*H04W 4/00*     (2009.01)
*H04L 12/58*    (2006.01)
*H04W 4/14*     (2009.01)

(52) U.S. Cl.
CPC ............. *H04W 4/14* (2013.01); *H04L 12/5895* (2013.01); *H04L 12/5875* (2013.01); *H04L 51/38* (2013.01); *H04L 51/30* (2013.01)
USPC ....................... 455/466; 455/412.2; 455/414.4

(58) Field of Classification Search
CPC ....... H04W 4/12; H04W 4/14; H04W 88/184; H04W 68/00; H04L 51/00; H04L 51/36; H04L 12/58; H04L 12/589; H04L 1/72552

USPC ..................... 455/412.2, 414.4, 466
See application file for complete search history.

(56) References Cited

U.S. PATENT DOCUMENTS 5,878,351 A *  3/1999  Alanara et al. ................ 455/466
7,379,732 B2 * 5/2008  Bells et al. .................. 455/412.2

(Continued)

FOREIGN PATENT DOCUMENTS

KR   2001-0028888 A    4/2001
KR   10-0915910 A      9/2009

OTHER PUBLICATIONS

Lin, Y, "GSM Point-to-Point Short Message Service", International Journal of Wireless Information Networks, vol. 4, No. 4, pp. 249-256, Jan. 1, 1997, XP55008427.*

*Primary Examiner* — Liton Miah
(74) *Attorney, Agent, or Firm* — Birch, Stewart, Kolasch & Birch, LLP

(57) ABSTRACT

The system comprises wireless user equipment (UE) and a core network unit interfaced with the UE through a wireless access network. A first short message relay (SMR) entity and a first short message control entity (SMC) are provided in the core network unit or the UE, the other one having a second SMR entity and a second SMC entity. The method of exchanging SMS data comprises, in the first SMC entity:—transmitting to the second SMC entity first control protocol data (CP_DATA) conveying relay protocol data (RP_DATA) provided by the first SMR entity,—receiving from the second SMC entity second CP_DATA conveying relay protocol acknowledgement information (RP_ACK) from the second SMR entity; and—retransmitting the first CP_DATA unless an acknowledgement is received from the second SMC entity before a timer expires. The second CP_DATA is interpreted as an acknowledgement for deciding whether the first CP_DATA is to be retransmitted.

7 Claims, 7 Drawing Sheets

(56) References Cited

U.S. PATENT DOCUMENTS

| | | |
|---|---|---|
| 8,032,164 B2* | 10/2011 | Aghili et al. .................. 455/466 |
| 8,041,335 B2* | 10/2011 | Khetawat et al. .......... 455/404.2 |
| 2008/0025343 A1* | 1/2008 | Rangel et al. ................. 370/469 |
| 2009/0061860 A1 | 3/2009 | Jiang |
| 2010/0029311 A1* | 2/2010 | Macek ........................... 455/466 |
| 2010/0167736 A1* | 7/2010 | Kobayashi ................. 455/435.2 |

* cited by examiner

METHOD OF EXCHANGING SMS DATA IN A WIRELESS COMMUNICATIONS SYSTEM

This application is the National Phase of PCT/KR2011/000874 filed on Feb. 9, 2011, which claims priority under 35 U.S.C. 119(e) to U.S. Provisional Application Nos. 61/303,262filed on Feb. 10, 2010 and 61/303,614 filed on Feb. 11, 2010 in the Republic of Korea, all of which are hereby expressly incorporated by reference into the present application.

TECHNICAL FIELD

The present invention relates to wireless communications systems providing a Short Message Service (SMS). It is applicable, in particular, to mobile communications networks as developed in the framework to the 3rd Generation Partnership Project (3GPP).

BACKGROUND ART

The SMS service provides means to transfer messages between a wireless terminal and a remote short message entity via a service center. In 3GPP, the technical realization of the Short Message Service is described in the technical specification 3GPPTS23.040, version 9.1.0, Release 9, published in September 2009, while support of the point-to-point Short Message Service on the mobile radio interface is described in the technical specification 3GPPTS24.011, version 9.0.1, Release 9, published in February 2010.

The directions in which the short messages are sent are referred to as "MO" for Mobile Originating and "MT" for Mobile Terminated.

The SMS service was originally designed for human-operated wireless terminals. Nowadays, it is considered for the development of Machine-Type Communication (MTC), which is a form of data communication involving one or more entities that do not need human interaction. MTC is a Release-10 work item in 3GPP. Related service requirements are given in the technical specification 3GPP TS 22.368, version 1.0.0, published in August 2009. The study on the MTC architecture is the topic of the technical report 3GPPTR23.888, version 0.2.0, published in January 2010. A proposal under study in 3GPPTR23.888 is the use of SMS over Non-Access Stratum (NAS) signaling for transmission of low-volume data.

FIG. 1, copied from 3GPPTS23.040, shows the overall SMS architecture in the universal mobile telecommunication system (UMTS), providing a means for conveyance of short messages between the mobile station (MS) 10 and the SMS Service Centre (SMS-SC) 20. The short messages are carried inside the control plane of the UMTS circuit-switched domain, i.e. via the mobile switching center (MSC), or of the UMTS packet-switched domain, i.e. via the serving GPRS support node (SGSN). The MSC/SGSN 11 cooperates via a reference point 5 with the MS, via a reference point 4 with the visitor location register (VLR) 12 for mobility management, and via a reference point 3 with (i) an SMS-interworking MSC (SMS-IWMSC) 13 for MO messages and (ii) an SMS-Gateway MSC (SMS-GMSC) for MT messages. The SMS-GMSC 15 cooperates with the home location register (HLR) via a reference point 2 to help locating roaming users. For the MT case, the messages may transit via an SMS router 14 having the reference point 3 with the MSC/SGSN 11 on the one hand and with the SMS-GMSC 15 on the other hand. If it is not present, the reference point 3 extends from the SMS-GMSC 15 directly to the MSC/SGSN 11. The reference point 1 is standardized for communication between the SMS-SC 20 and the SMS-IWMSC 13 or SMS-GMSC 15.

The UMTS uses a so-called UMTS terrestrial radio access network (UTRAN) for the radio part of the communication with the MS (also called user equipment, UE). The radio interface is called Uu. The UTRAN has base stations called "node B" distributed over the coverage area of the cellular network and radio network controllers (RNC) interfaced with the MSC/SGSN 11 through an interface called Iu and each controlling a plurality of nodes B. Alternatively, the radio access network can be a GSM-EDGE radio access network (GERAN) with base stations having a radio interface Um with the MSs, and controlled by base station controllers (BSC) connected to the MSC through an interface called A for the circuit-switched (CS) domain and to the SGSN through an interface called Gb for the packet-switched (PS) domain.

The Evolved Packet System (EPS) is a successor of UMTS, developed by 3GPP in the context of the long-term evolution (LTE). It uses an evolved UTRAN (E-UTRAN) for radio access over and LTE-Uu interface. When using the E-UTRAN access, SMS can be delivered via the CS domain (reference point 3) and then via the so-called SGs reference point, connecting the MSC to the mobility management entity (MME), as depicted in FIG. 2, taken from the technical specification 3GPP TS 23.272, version 9.2.0, published in December 2009. The MME 21 is an entity of the evolved packet core (EPC) which communicates with the E-UTRAN through an interface called S1-MME. The MSC entity used for SMS delivery in CS fallback mode in the EPS context is referred to as MSC server 11A. If UTRAN and/or GERAN access is available in an EPS network, the MSC/SGSN node 11 shown in FIG. 1 can be considered as being split between two nodes, the MSC server 11A for the CS domain and the SGSN 11B for the PS domain.

FIG. 2 summarizes available options for the delivery of SMS in a 3GPP network. Corresponding hierarchical models showing the relevant protocol layers in the MS 10 and the peer core network entity are shown in FIGS. 3-6 taken from 3GPPTS24.011, where the following abbreviations are used:

SM-AL Short Message Application Layer;
SM-TL Short Message Transfer Layer;
SM-RL Short Message Relay Layer;
SM-RP Short Message Relay Protocol;
SMR Short Message Relay (entity);
CM-sublayer Connection Management sublayer;
SM-CP Short Message Control Protocol;
SMC Short Message Control (entity);
MM-sublayer Mobility Management sublayer;
GMM-sublayer GPRS Mobility Management sublayer;
RR-sublayer Radio Resource Management sublayer;
LLC-sublayer Logical Link Control sublayer;
GRR-sublayer GPRS Radio Resource sublayer in GSM;
EMM-sublayer EPS Mobility Management sublayer.

FIG. 3 shows the layer structure of the MSC 11A and the MS 10 for circuit-switched SMS service, the reference point 5 being conveyed through the Uu and Iu-cs interfaces (UTRAN case) or through the Um and A interfaces (GERAN case).

FIG. 4 shows the layer structure of the SGSN 11B and the MS 10 for the SMS service in Gb mode, the reference point 5 being conveyed through the Um and Gb interfaces (GERAN case).

FIG. 5 shows the layer structure of the SGSN 11B and the MS 10 for the SMS service in Iu mode, the reference point 5 being conveyed through the Uu and Iu-ps interfaces (UTRAN case).

FIG. 6 shows the layer structure of the MSC server 11A and the MS 10 for the SMS service in S1 mode, the reference point 5 being conveyed through the LTE-Uu, S1-MME and SGs interfaces (E-UTRAN case). The protocol stack on the MME is not shown.

In each of these scenarios, the MS 10 has a short message relay (SMR) entity 30 on top of an short message control (SMC) entity 31, and a node of the core network (the MSC/MSC server 11A or the SGSN 11B) has corresponding SMR and SMC entities 32, 33. An MS 10 may have two SMR entities and two SMC entities to be able to simultaneously receive MT messages and send MO messages. The peer protocol between two SMC entities is denoted SM-CP, while the peer protocol and between two SMR entities is denoted SM-RP.

The SMR entity using the Short Message Relay Protocol (SM-RP) provides to the Short Message Transport Layer (SM-TL) the service of delivering SMS data in acknowledged mode. The SMS data are sent in relay protocol data (RP_DATA) in suitable SM-RP messages, and the sending SMR entity expects the peer SMR entity to return relay protocol acknowledgment information (RP_ACK).

The acknowledgment information RP_ACK is generated and sent by the peer SMR entity if and when a response is received from the higher layers to which the SMS data were relayed. In the MT case, the higher layer protocol instances receiving the SMS data are also located in the MS, so usually the response is rather quickly received by the SMR entity. In the MO case, the SMS data are intended for the remote SMS-SC 20 and the response acknowledging reception may take longer. The SM-RL procedures provide various behaviors of the SMR entity on the transmitting side if the RP_ACK is not received before expiry of a timer which is typically of the order of a few tens of seconds in the MO case (MS side), or if an error indication is received from the underlying connection management sublayer.

The SMC entity using the Short Message Control Protocol (SM-CP) provides the service of transmitting in acknowledged mode protocol data units from the relay layer (RPDU). An RPDU can consist of RP_DATA, RP_ACK, or other kinds of data units from the SM-RL. The RPDUs are sent in control protocol data (CP_DATA) and the sending SMC entity expects the peer SMC entity to return control protocol acknowledgment information (CP_ACK). The CM-sublayer procedures require retransmission of the RPDU if the CP_ACK is not received before expiry of a timer which is typically of the order of one or a few seconds. A maximum number of such retransmissions (1, 2 or 3) can be performed, and if the CP_ACK is still missing, an error indication is passed to the SM-RL layer.

The message transfers in the SMS-RL and the CM sublayer for SMS delivery are illustrated in FIG. 7 in the MO case and in FIG. 8 for the MT case. Here, the reference sign 100 designates the core network unit which includes the SMR and SMC entities 32, 33 corresponding to those present in the MS 10. This core network unit 100 may be the MSC or MSC server 11A or the SGSN 11B depending on the network architecture.

Not shown in FIGS. 7 and 8 for simplicity is the signaling between the CM-sublayer and the underlying mobility management (MM) layers providing the wireless connection with the MS 10. Generally, the network side decides when to release that connection and instructs the MM layer accordingly. In the MT case, this can be done once the SMR entity 32 in the network unit 100 receives the RP_ACK confirming that the SMS data transfer was successfully completed. In the MO case, the network unit 100 must wait for reception of the final CP_ACK by the SMC entity 33, i.e. the CP_ACK confirming reception of the CP_DATA that carried the RP_ACK. If the SMS are transported in the EPS, the MME 21 handles the connection and the MSC server 11A informs it when connection establishment or release is needed using SGs procedures.

It can happen that an entity has a series of short messages to send. In this case, it is generally useful to maintain the connection between the network unit 100 and the MS 10 in between individual message transfers. The short messages are then concatenated without release of the connection. For MT transfers, this is easily done under control of the network unit 100 which controls release of the connection. If several MT short messages follow each other, the network unit 100 can keep the connection alive after receipt of the RP_ACK relating to SMS data which are not the last ones of the series and use that connection again for transmission of further SMS data. If a final CP_ACK is not received by the SMC entity 31 on the MS side, e.g. due to transmission errors or handover, there can be some retransmissions of the CP_DATA carrying the RP_ACK. In the meantime, if the SMC entity 31 on the MS side receives further CP_DATA with a different transaction identifier, i.e. carrying new RP_DATA as RPDU, it interprets that reception as an implicit reception of the missing final CP_ACK.

For concatenated MO short message transfers, the network unit 100 does not know whether or not the MS has more messages to transfer. If the MS chooses to use the same connection for transferring further SMS data of a series, it must refrain from acknowledging the CP_DATA that carried the RP_ACK by means of the final CP_ACK, in order to avoid undesired release of the connection by the network. Instead, the SMC entity 31 on the MS side can transmit CP_DATA for the next RPDU containing new RP_DATA. Here too, reception of such CP_DATA with a different transaction identifier and carrying an RPDU is interpreted by the peer SMC entity 33 on the network side as the implicit reception of the awaited final CP_ACK. A final CP_ACK is eventually returned by the MS 10 when it has no more SMS data to transfer, so the peer SMC entity 33 in the network can trigger release of the connection.

FIG. 9 illustrates the transfer of a series of three concatenated MO short messages. It is seen that the SMC entity 31 on the MS side responds to CP_DATA 40 carrying an RP_ACK by returning a final CP_ACK 41 only when the whole series of concatenated messages has been successfully transferred. Before that, downlink CP_DATA 42 (carrying an RP_ACK) is not acknowledged by the SMC entity 31 which simply forwards the RP_ACK to the SMR entity 30. After reception of the RP_ACK, the SMR entity 30 can provide new RP_DATA, and the SMC entity 31 sends CP_DATA 43 to the network side, containing the new RP_DATA. The peer SMC entity 33 then interprets reception of this CP_DATA 43 as acknowledging the previously sent CP_DATA 42.

DISCLOSURE OF INVENTION

Technical Problem

The above-described operation of the short message relay layer and the connection management sublayer is not optimal in terms of traffic on the radio interface. In the case of FIGS. 7-8, transmission of one short message results in four messages sent back and forth on the air. In the case of concatenated MO messages, where some CP_ACKs are dispensed with to avoid release of the connection, the efficiency is also poor (nine messages exchanged on the air for three short messages in the example of FIG. 9). In addition, some retransmissions (not shown in the diagrams of FIGS. 7-9) take place in case of non-reception of a CP_ACK before the applicable CM sublayer timer expires.

While SMS works well today with mostly human users and comparably a much smaller population of MTC devices, its sub-optimal transport over the air is likely to become an issue with the increase of MTC devices in the field. There is thus a need for more efficient transport of SMS data.

Solution to Problem

A method of exchanging SMS data in a wireless communications system is proposed. The wireless communications system comprises wireless user equipment and a core network unit interfaced with the user equipment through a wireless access network. A first short message relay (SMR) entity and a first short message control (SMC) entity are provided in one of the core network unit and the user equipment, while a second SMR entity and a second SMC entity are provided in the other one of the core network unit and the user equipment. The method comprising, in the first SMC entity:

transmitting first control protocol data to the second SMC entity, the first control protocol data conveying relay protocol data provided by the first SMR entity for the second SMR entity;

receiving from the second SMC entity second control protocol data conveying relay protocol acknowledgement information from the second SMR entity; and retransmitting the first control protocol data unless a control protocol acknowledgement is received from the second SMC entity before a timer expires. The second control protocol data is interpreted as a control protocol acknowledgement for deciding whether the first control protocol data is to be retransmitted.

In other words, the SMC entity on the user equipment (UE) or MS side in the MO case, or on the network side in the MT case, interprets reception of the second control protocol data (CP_DATA) carrying relay protocol acknowledgment information (RP_ACK) as an implicit reception of a control protocol acknowledgement for the first CP_DATA which it previously sent to forward the relay protocol data (RP_DATA). This may avoid unnecessary repetition of the first CP_DATA.

It makes its unnecessary, in preferred embodiments of the method, for the peer SMC entity to return explicit control protocol acknowledgement information (CP_ACK) in response to reception of the first CP_DATA, thus saving other message transmissions on the air.

For mobile-terminated (MT) short message transfers, the first SMR entity and the first SMC entity are provided in the core network unit, while the second SMR entity and the second SMC entity are provided in the UE.

In the MT case, the first SMC entity may respond to reception of the second CP_DATA conveying the RP_ACK by transmitting to the second SMC entity further CP_DATA conveying further RP_DATA provided by the first SMR entity or by providing a message for releasing communication resources between the first and second SMC entities, without returning explicit CP_ACK for the second CP_DATA. Then the second SMC entity, which retransmits the second CP_DATA unless a control protocol acknowledgement is received from the first SMC entity before a timer expires, may interpret the further CP_DATA as a control protocol acknowledgement for deciding whether the second CP_DATA is to be retransmitted.

For mobile-originated (MO) short message transfers, the first SMR entity and the first SMC entity are provided in the UE, while the second SMR entity and the second SMC entity are provided in the core network unit.

In the MO case, the first SMC entity may respond to reception of the second CP_DATA conveying the RP_ACK by transmitting to the second SMC entity either further CP_DATA conveying further RP_DATA provided by the first SMR entity or explicit CP_ACK for the second CP_DATA. Then the second SMC entity, which retransmits the second CP_DATA unless a control protocol acknowledgement is received from the first SMC entity before a timer expires, may interpret the further CP_DATA as a control protocol acknowledgement for deciding whether the second CP_DATA is to be retransmitted. On the other hand, if an explicit CP_ACK is received from the UE, the second SMC entity triggers release of communication resources between the first and second SMC entities.

The method is well suited to the expansion of MTC devices which are expected to generate large amounts of SMS data. It makes it possible to limit the corresponding traffic on the air interface. In a typical embodiment, the UE is thus part of a machine type of device.

Another aspect of the invention relates to a wireless communication terminal, comprising:

a first SMR entity for providing RP_DATA for a second SMR entity of a core network unit and for receiving RP_ACK from the second SMR entity; and a first SMC entity for transmitting first CP_DATA to a second SMC entity of the core network unit, the first CP_DATA conveying the RP_DATA, and for receiving second CP_DATA from the second SMC entity, the second CP_DATA conveying the RP_ACK.

The first SMC entity of the wireless communication terminal is arranged for retransmitting the first CP_DATA unless a control protocol acknowledgement is received from the second SMC entity before a timer expires, and for interpreting the second CP_DATA as a control protocol acknowledgement for deciding whether the first CP_DATA is to be retransmitted.

Another aspect of the invention relates to a unit of a packet core network, capable of communicating with wireless user equipment through a wireless access network. The core network unit comprises:

a first SMR entity for providing RP_DATA for a second SMR entity of the wireless user equipment and for receiving RP_ACK from the second SMR entity; and a first SMC entity for transmitting first CP_DATA to a second SMC entity of the wireless user equipment, the first CP_DATA conveying the RP_DATA, and for receiving second CP_DATA from the second SMC entity, the second CP_DATA conveying the RP_ACK.

The first SMC entity of the packet core network unit is arranged for retransmitting the first CP_DATA unless a control protocol acknowledgement is received from the second SMC entity before a timer expires, and for interpreting the second CP_DATA as a control protocol acknowledgement for deciding whether the first CP_DATA is to be retransmitted.

Other features and advantages of the method and devices disclosed herein will become apparent from the following description of non-limiting embodiments, with reference to the appended drawings.

MODE FOR THE INVENTION

Figure 1:
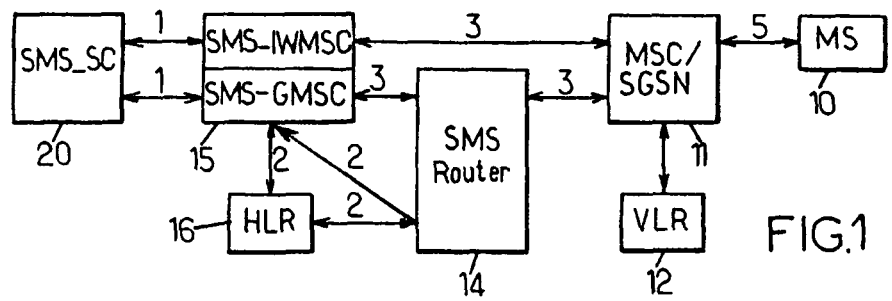
FIG. 1 is a diagram showing the architecture of a UMTS system as used for SMS transfer.
Figure 2:
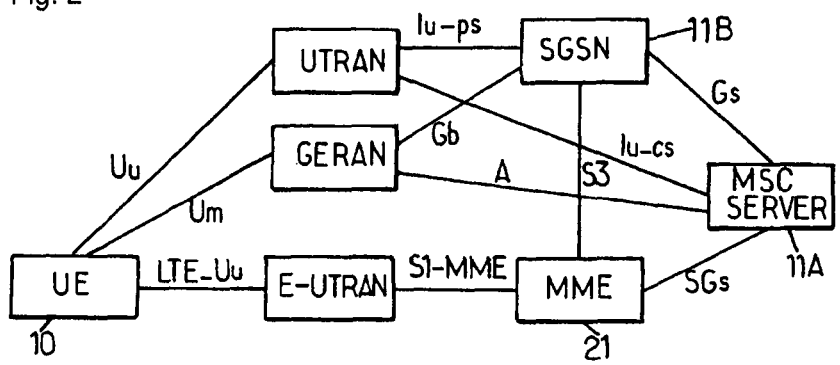
FIG. 2 is a diagram illustrating the EPS architecture for CS fallback and SMS over SGs.
Figure 3:
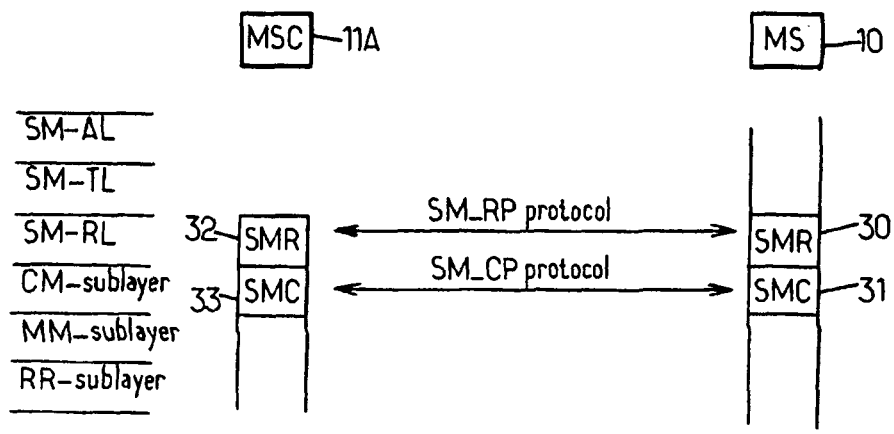
FIGS. 3-6 are diagrams showing the protocol hierarchy used for the short message service in different kinds of core network infrastructure.
Figure 4:
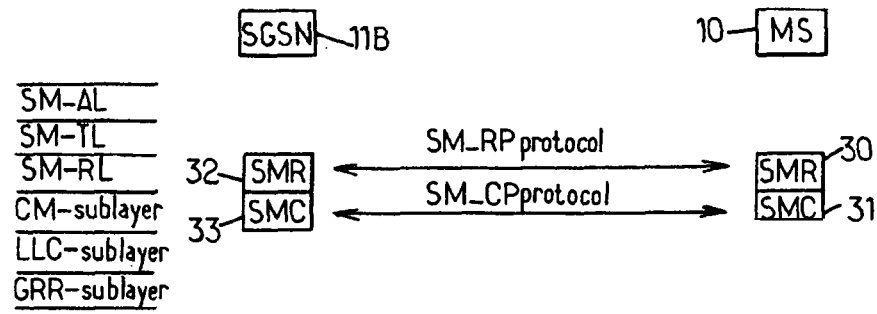
Figure 5:
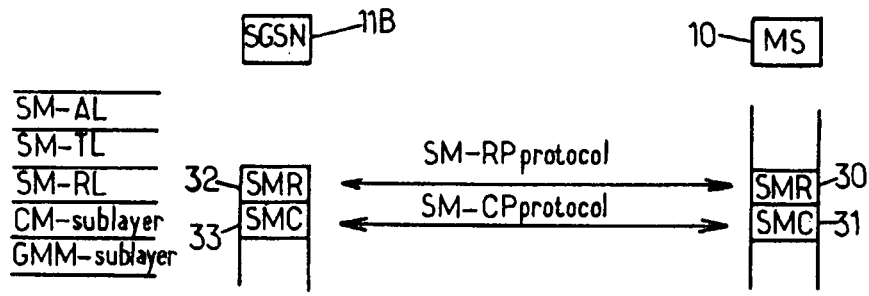
Figure 6:
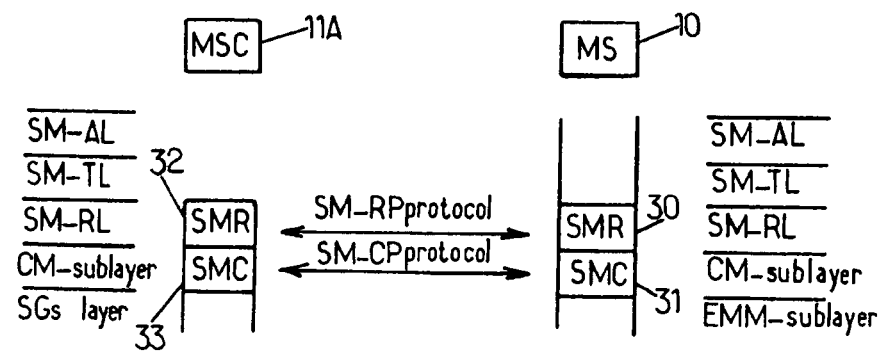
Figure 7:
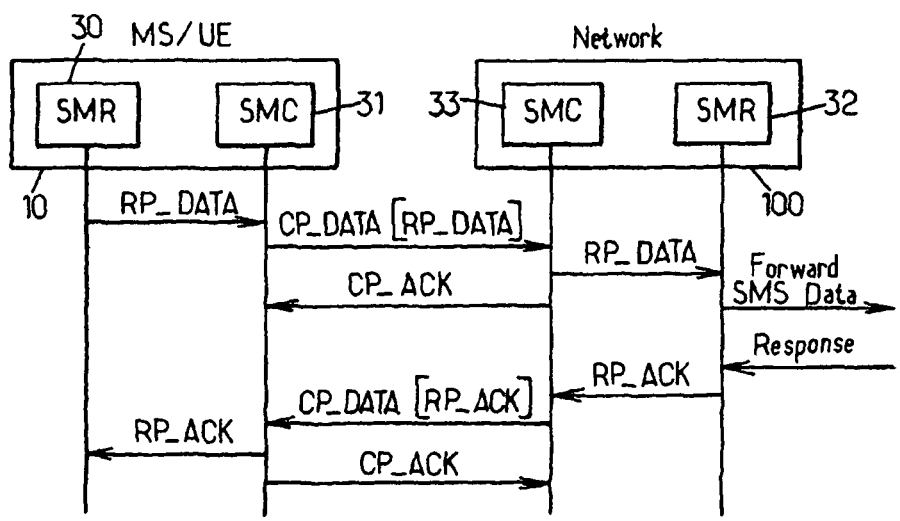
FIGS. 7-9 show call flows in the short message relay layer and the connection management sublayer for a single MO transfer, for a single MT transfer and for concatenated MO transfers, respectively, according to the prior art.
Figure 8:
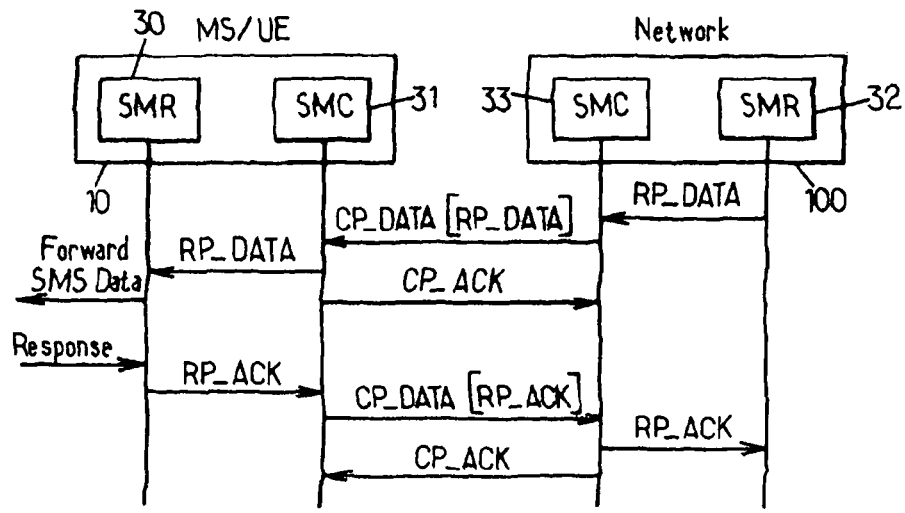
Figure 9:
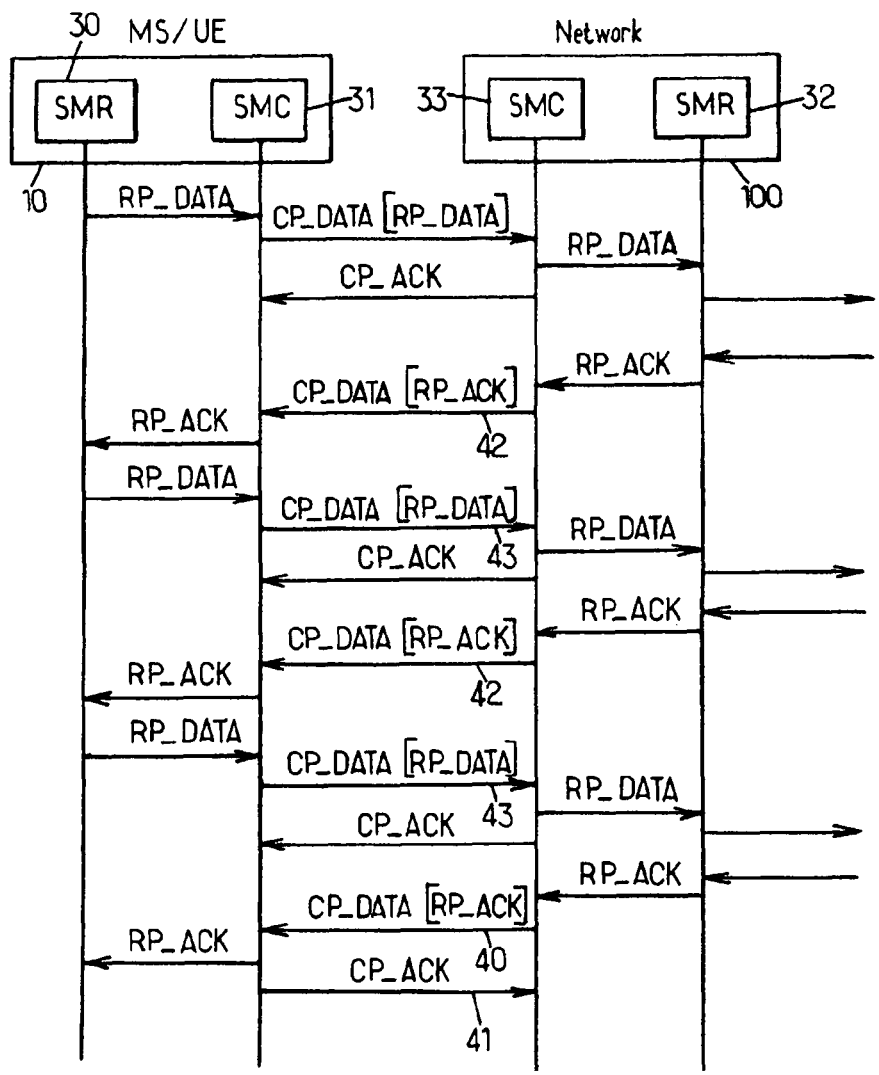

The method disclosed herein is applicable to the transfer of both MO and MT SMS data. It can be implemented with different network infrastructures such as those illustrated in FIGS. 1-2 and different types of radio access network such as GERAN, UTRAN, E-UTRAN, etc., provided that the MS/UE 10 has SMR and SMC entities 30, 31, and that a peer core network unit 100 (MSC 11, MSC server 11A, SGSN 11B) has peer SMR and SMC entities 32, 33.

Figure 10:
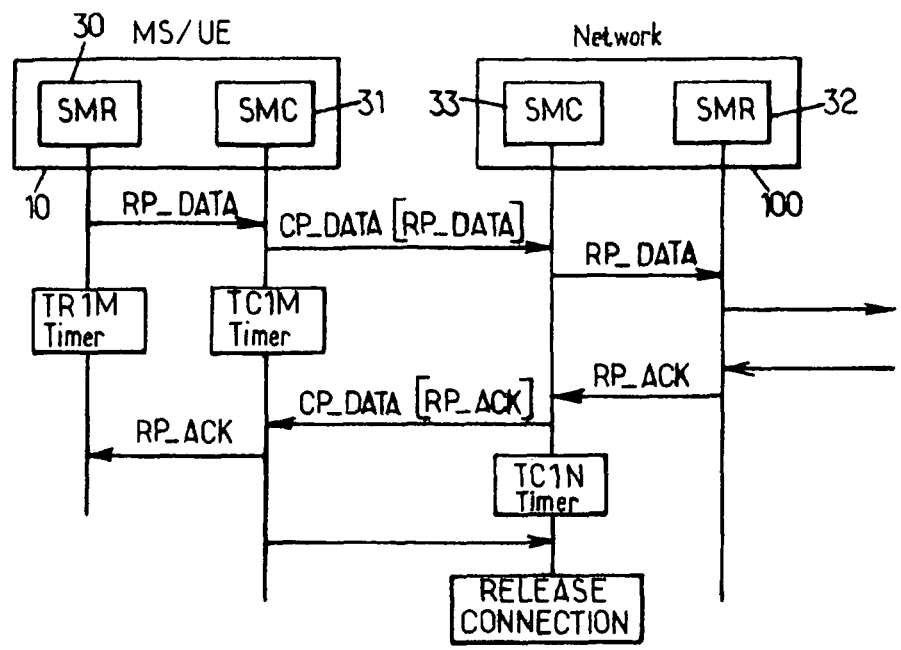
FIGS. 10-13 show call flows in the short message relay layer and the connection management sublayer for a single MO transfer, for concatenated MO transfers, for a single MT transfer and for concatenated MT transfers, respectively, according to embodiments of the invention.

Transfer of a single MO short message in an embodiment is illustrated in FIG. 10. On the UE side, the SMS data are provided as RP_DATA by the SMR entity 30 which starts a timer TR1M to await reception of RP_ACK. After the appropriate connection establishment signaling (not shown), the SMC entity 31 sends the RP_DATA to the peer SMC entity 33 as CP_DATA and starts a timer TC1M, expecting return of an acknowledgment before TC1M expires. The SMC entity 33 on the network side receives the CP_DATA containing the RP_DATA and relays the RP_DATA to the SMR entity 32 without returning a CP_ACK to the sending SMC entity 31.

When the SMR entity 32 obtains information from the SMS service center that the SMS data was duly received, it provides an RP_ACK to the SMC entity 33. The SMC entity 33 transmits CP_DATA containing the RP_ACK to the sending SMC entity 31 and starts a timer TC1N, expecting return of an acknowledgment before TC1N expires.

The timer values may be different on the UE side and on the network side. The values of TC1M and TC1N are set sufficiently large to let the lower layer procedures complete their operation, but sufficiently small to allow the set number of retransmissions in the CM sublayer before expiry of the timer TR1M or TR1N during which the short message relay layer awaits reception of the RP_ACK.

Upon receipt of downlink CP_DATA (containing the RP_ACK), the sending SMC entity 31 interprets that reception as a control protocol acknowledgment of the previously sent CP_DATA (containing the RP_DATA). Therefore, it stops the TC1M timer. If CP_DATA[RP_ACK] is not received before expiry of TC1M, the SMC entity 31 retransmits the previous CP_DATA with the same transaction identifier. The number of such retransmissions is configurable, for example 1, 2 or 3. The RP_ACK is forwarded to the SMR entity 30. Since the UE 10 has no more SMS data to transfer, the SMC entity 31 returns a final CP_ACK.

Reception of the final CP_ACK by the SMC entity 33 on the network side stops the TC1N timer (one or more retransmissions of CP_DATA[RP_ACK] may have taken place in the meantime). The SMC entity 33 then issues a message to the underlying MM layer to release the connection with the UE 10.

In the MO case, it may take a non-negligible time for the RP_ACK to be returned by the network, due to the time needed to reach the SMS-SC server 20 and the processing time in that server. To avoid unnecessary repetition of the CP_DATA[RP_DATA] by the SMC entity 31, it may be useful to set a relatively high value for TC1M (for example one third or one quarter of TR1M). This may cause some delay in the transfer of the SMS data if the wireless connection between the UE and the network is not very good. However, such delay will not be problematic in most cases, because many MTC devices are delay-tolerant, or can accept low-priority communication.

Figure 11:
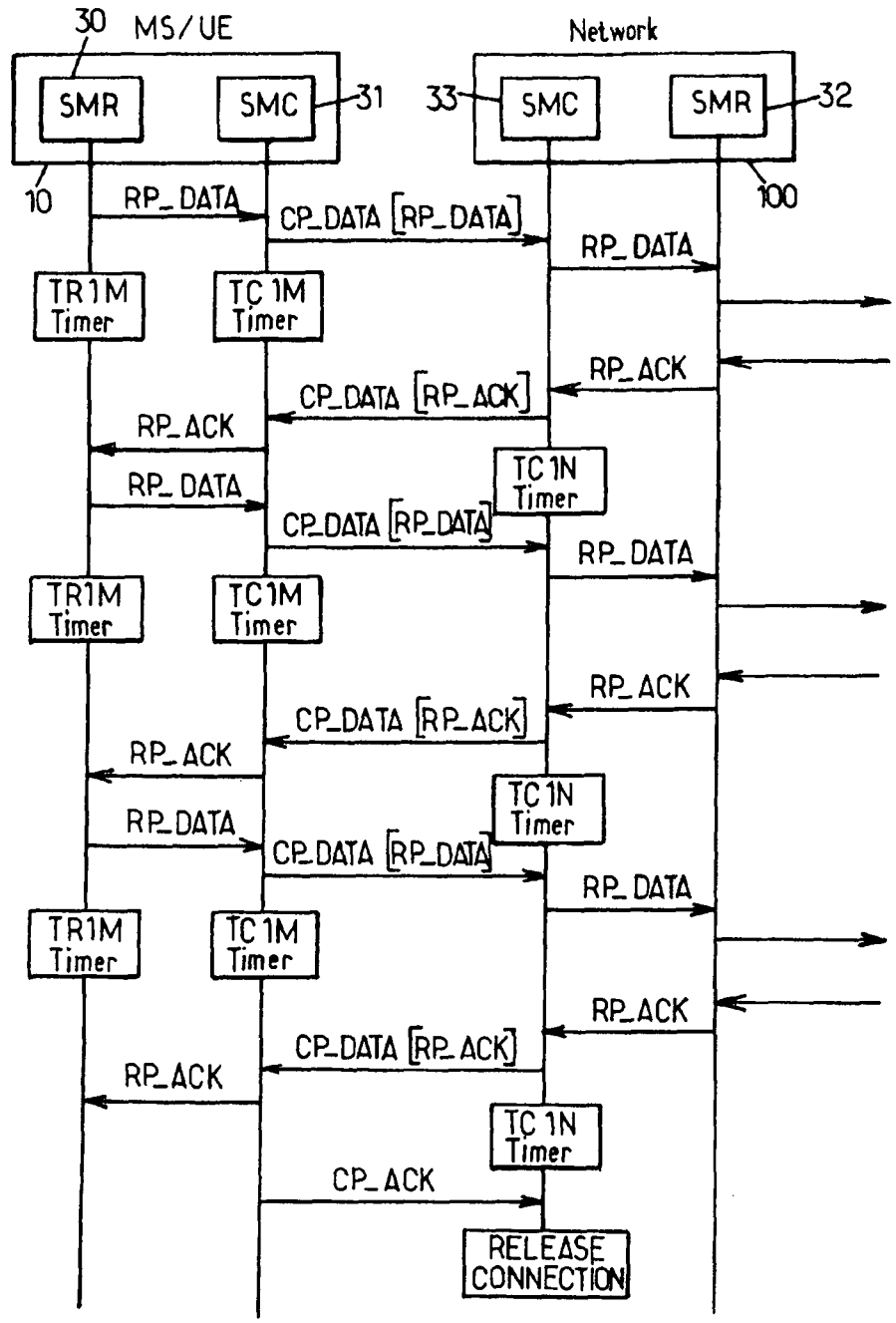

A possible call flow in the case of concatenated MO messages is shown in FIG. 11. Individual message exchanges similar to those shown in FIG. 10 follow each other without the UE 10 returning the final CP_ACK when new MO SMS data remain to be transmitted using the same connection. Instead, the SMC entity 31 on the UE side returns CP_DATA containing the new RP_DATA, and starts the TC1M timer. Reception of the CP_DATA[RP_DATA] by the SMC entity 33 on the network side is interpreted as a control protocol acknowledgment of the previously sent CP_DATA [RP_ACK]. The SMC entity 33 then stops the TC1N timer.

Such individual MO transfers without final CP_ACK follow each other until the UE 10 has no more SMS data to transfer. At that time, the SMC entity 31 responds to reception of the last downlink CP_DATA (containing an RP_ACK) by returning the final CP_ACK which will enable the peer SMC entity 33 to trigger release of the connection with the UE.

Figure 12:
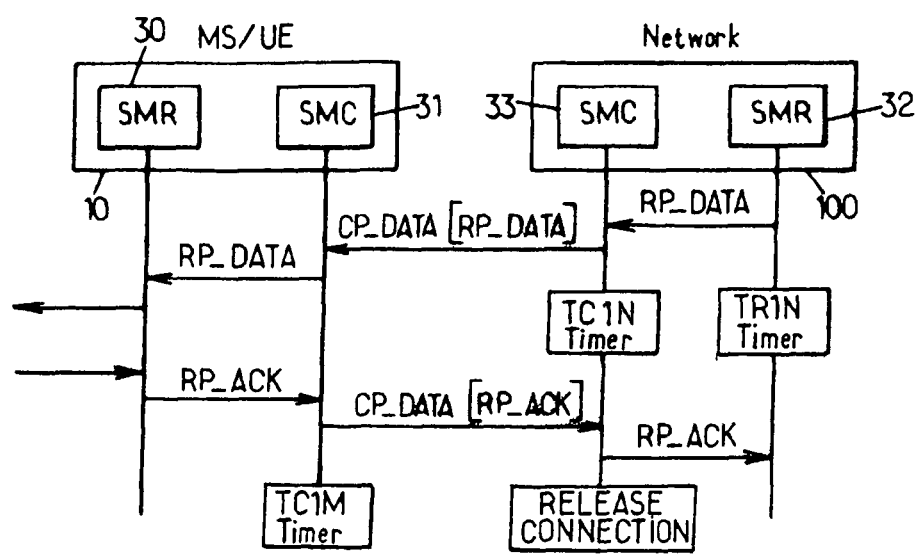

Transfer of a single MT short message in an embodiment is illustrated in FIG. 12. On the network side, the SMS data are provided as RP_DATA by the SMR entity 32 which starts the TR1N timer to await reception of RP_ACK. After the appropriate connection establishment signaling (not shown), the SMC entity 33 sends the RP_DATA to the peer SMC entity 31 as CP_DATA and starts the TC1N timer, expecting return of an acknowledgment before TC1N expires. The SMC entity 31 on the UE side receives the CP_DATA containing the RP_DATA and relays the RP_DATA to the SMR entity 30 without returning a CP_ACK to the sending SMC entity 33.

When the SMR entity 30 obtains information from the higher layers that the SMS data was duly received, it provides an RP_ACK to the SMC entity 31. The SMC entity 31 transmits CP_DATA containing the RP_ACK to the sending SMC entity 33 and starts the TC1M timer, expecting return of an acknowledgment before TC1M expires.

Upon receipt of uplink CP_DATA (containing the RP_ACK), the SMC entity 33 interprets that reception as a control protocol acknowledgment of the previously sent CP_DATA (containing the RP_DATA). Therefore, it stops the TC1N timer, possibly after one or some retransmissions of the previous CP_DATA, without returning a CP_ACK to the peer SMC entity 31. The RP_ACK is forwarded to the SMR entity 32. Since the network side has no more SMS data to transfer, the SMC entity 33 issues a message to the underlying MM layer to release the connection with the UE 10. If, on the UE side, the TC1M timer expires before the connection is released, the CP_DATA containing the RP_ACK may be retransmitted one or a few times.

It is noted that no CP_ACK at all needs to be transmitted in the MT case.

Figure 13:
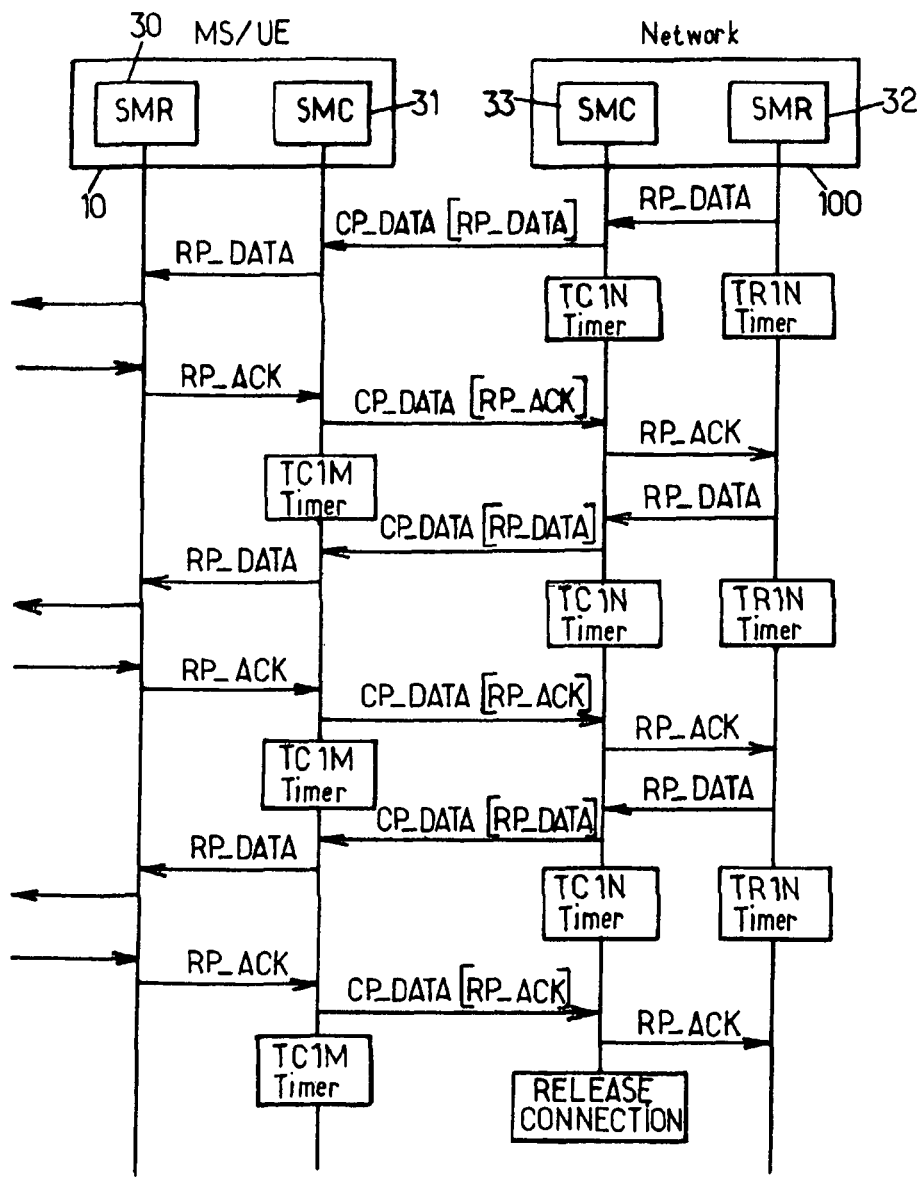

A possible call flow in the case of concatenated MT messages is shown in FIG. 13. Individual message exchanges similar to those shown in FIG. 12 follow each other without any CP_ACK. The SMC entity 33 on the network side sends CP_DATA containing new RP_DATA as long as further MT SMS data remain to be transferred using the same connection. Each time, transmission of CP_DATA[RP_DATA] starts the TC1N timer. Reception of the CP_DATA[RP_DATA] by the SMC entity 31 on the UE side is interpreted as a control protocol acknowledgment of the previously sent CP_DATA [RP_ACK]. The SMC entity 31 then stops the TC1M timer.

Such individual MT transfers follow each other until the network has no more SMS data to transfer. At that time, the SMC entity 33 triggers release of the connection with the UE.

The above optimization of the SMR and SMC entities, as illustrated in FIGS. 10-13, can be easily implemented by adapting the software used by the processors in charge of the SM-RP and SM-CP protocols both on the network side and on the UE side. On the network side, the core network unit 100 may be an MSC/SGSN 11, an MSC server 11A, an SGSN 11B, depending on the infrastructure.

The optimization substantially reduces the traffic needed on the air interface to transfer SMS data. It is particularly useful in the context of an increase of the SMS traffic, which can be anticipated with the deployment of large numbers of MTC devices.

While a detailed description of exemplary embodiments of the invention has been given above, various alternatives, modifications, and equivalents will be apparent to those skilled in the art. Therefore the above description should not be taken as limiting the scope of the invention which is defined by the appended claims.

The invention claimed is:

1. A method of exchanging short message service (SMS) data in a wireless communications system comprising a user equipment (UE) and a core network unit interfaced with the UE through a wireless access network, wherein a first short message relay (SMR) entity and a first short message control (SMC) entity are provided in the UE, and a second SMR entity and a second SMC entity are provided in the core network unit, the method comprising:
for a mobile originated (MO) message, transmitting, at the first SMC entity, first control protocol (CP) data to the second SMC entity, the first CP data conveying relay protocol (RP) data provided by the first SMR entity for the second SMR entity;
starting a timer of the UE when transmitting the first CP data;
in response to the first CP data, receiving, at the first SMC entity from the second SMC entity, second CP data conveying RP acknowledgement information from the second SMR entity, wherein no CP acknowledgement is received from the second SMC entity before the RP acknowledgement information is received at the second SMC entity;
stopping the timer of the UE if the second CP data conveying the RP acknowledgement information is received at the first SMC entity; and
retransmitting the first CP data if the second CP data conveying the RP acknowledgement information is not received at the first SMC entity before the timer of the UE expires.

2. The method of claim 1, further comprising:
in response to the second CP data received before the timer of the UE expires, transmitting, at the first SMC entity, a final CP acknowledgement to allow the second SMC entity to release a connection established at the core network unit for the SMS data.

3. The method of claim 1, wherein the MO message is a single SMS message.

4. The method of claim 1, wherein the timer of the UE is equipped in the first SMC entity.

5. A method of exchanging short message service (SMS) data in a wireless communications system comprising a user equipment (UE) and a core network unit interfaced with the UE through a wireless access network, wherein a first short message relay (SMR) entity and a first short message control (SMC) entity are provided in the UE, and a second SMR entity and a second SMC entity are provided in the core network unit, the method comprising:
for a mobile terminated (MT) message, transmitting, at the second SMC entity, first control protocol (CP) data to the first SMC entity, the first CP data conveying relay protocol (RP) data provided by the second SMR entity for the first SMR entity;
starting a timer of the core network unit when transmitting the first CP data;
in response to the first CP data, receiving, at the second SMC entity from the first SMC entity, second CP data conveying RP acknowledgement information from the first SMR entity, wherein no CP acknowledgement is received from the first SMC entity before the RP acknowledgement information is received at the first SMC entity;
stopping the timer of the core network unit if the second CP data conveying the RP acknowledgement information is received at the second SMC entity; and
retransmitting the first CP data if the second CP data conveying the RP acknowledgement information is not received at the second SMC entity before the timer of the core network unit expires.

6. The method of claim 5, further comprising:
if the MT message is a single SMS message, releasing a connection established at the core network unit for the SMS data when the second CP data conveying the RP acknowledgement information is received before the timer of the core network unit expires.

7. The method of claim 5, wherein the timer of the core network unit is equipped in the second SMC entity.

* * * * *